(12) United States Patent
Wada

(10) Patent No.: US 7,042,597 B2
(45) Date of Patent: May 9, 2006

(54) ELECTRIC PART, OPTICAL PART, AND PROCESSING APPARATUS

(75) Inventor: Toshihide Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 09/832,727

(22) Filed: Apr. 11, 2001

(65) Prior Publication Data

US 2002/0054376 A1 May 9, 2002

(30) Foreign Application Priority Data

Apr. 12, 2000 (JP) .............................. 2000-111158

(51) Int. Cl.
*H04N 1/024* (2006.01)
(52) U.S. Cl. ...................... 358/472; 358/481; 358/401; 250/201.4; 250/226
(58) Field of Classification Search ................ 358/472, 358/401, 1.7, 481; 360/137; 382/281; 250/201.4, 250/226; 359/204, 210
See application file for complete search history.

(56) References Cited

U.S. PATENT DOCUMENTS 5,450,211 A * 9/1995 Kanai et al. ................. 358/401
5,561,743 A * 10/1996 Kanai et al. ................. 358/1.7
5,646,749 A * 7/1997 Omi et al. ................... 358/501
5,936,740 A 8/1999 Fukazawa et al. .......... 358/296
5,953,188 A * 9/1999 Higuchi et al. ............. 360/137

FOREIGN PATENT DOCUMENTS

JP 2-65381 5/1990
JP 9-139816 A 5/1997

OTHER PUBLICATIONS

A Partial English Translation of Japanese Utility Model No. 2-65381.
Search Report issued May 31, 2004, for counterpart application JP 2000-111158.

* cited by examiner

*Primary Examiner*—Edward L. Coles
*Assistant Examiner*—Heather D. Gibbs
(74) *Attorney, Agent, or Firm*—Morgan & Finnegan, LLP

(57) ABSTRACT

This scanner head includes a case member (300*b*) having a first side wall (300*f*) and a second side wall (300*y*), an electric circuit board (105) placed inside the case member (300*b*), a terminal board (309) including a terminal to be connected to the main apparatus and placed outside the first side wall (300*f*), a wiring unit (305) for connecting the electric circuit board (105) and the terminal board (309) through a slit opening (300*c*) formed in the first side wall (300*f*), and a shield plate (102). This shield plate (102) couples the first side wall (300*f*) and the second side wall (300*y*).

5 Claims, 12 Drawing Sheets

ELECTRIC PART, OPTICAL PART, AND PROCESSING APPARATUS

FIELD OF THE INVENTION

The present invention relates to an electric part, optical part, and processing apparatus and, more particularly, to an electric part to be connected to a main apparatus, an optical part for forming an image on an image sensing device, and a processing apparatus including these electric and optical parts.

BACKGROUND OF THE INVENTION

Recently, the demand for an original reading apparatus as an image processing apparatus is increasing. Examples of the original reading apparatus are a flat bed type original reading apparatus having an original plate and a film reading apparatus. Another example is an image processing apparatus capable of reading an image by replacing an interchangeable printhead of a printer with a scanner head having substantially the same shape as the printhead.

FIG. 2 is a view showing the construction of an image processing apparatus according to a preferred embodiment of the present invention. FIGS. 3A and 3B are views showing the outer appearance of a scanner head which can be attached to the image processing apparatus shown in FIG. 2. One conventional problem will be explained below with reference to FIGS. 2, 3A, and 3B. A detachable printhead 1 or a detachable scanner head 300 is selectively mounted on a carrier 2 of the image processing apparatus. The scanner head 300 has a scanner head case 300b which is substantially cubic. In the internal hollow portion of this scanner head case 300b, a sensor 302, a field lens 304, an image forming lens 301, illuminating LEDs 306, and the like as image reading parts are arranged. This scanner head 300 is mounted on the carrier 2 while being guided by guide portions 314. The scanner head 300 is electrically connected to the main body (image processing apparatus) by bringing a carrier terminal portion (not shown) into tight contact with a head terminal portion (terminal board) 309. This head terminal portion 309 is connected to a main electric circuit board for controlling the sensor 302 and the illuminating LEDs 306 in the scanner head case 300b via a printed circuit board 305.

To improve the ease of assembly of the internal parts of the scanner head 300, it is preferable to form as large an assembly opening as possible in the scanner head case 300b. However, a large assembly opening lowers the strength of the scanner head case 300b. In particular, a large load acts on the head terminal portion 309 for receiving electrical signals from the main body (image processing apparatus), in order to obtain a sufficient contact with the carrier terminal portion. Since this deforms the scanner head case 300b, it is impossible to obtain a sufficient contact as an original purpose.

FIG. 8 is a view showing the optical configuration of a general scanner unit. Another conventional problem will be described below with reference to FIG. 8. Light emitted from a light source 86 irradiates an original 18 via a condenser lens 85. The reflected light from the original 18 forms an image on a sensor 84 through lenses 82 and 83, and the sensor 84 reads this image. The focus can be placed on the sensor 84 by moving the lens 83 in the direction of an arrow a along an optical axis 81. In addition, any ramp of the read image can be eliminated by pivoting the sensor 84 through an angle θ on the optical axis 81.

These two adjustments are carried out when the sensor unit is almost completely assembled, because it is preferable to carry out these adjustments while monitoring outputs from the sensor. However, the focus adjustment of the above two adjustments is sometimes impossible to perform after assembly, if dimensional variations of the components or focal length variations of the lenses are large. When this is the case, it is necessary to disassemble the sensor unit, adjust a distance b in FIG. 8, reassemble the unit, and readjust the lens 83 in the direction of the arrow a, resulting in a very troublesome operation.

Still another problem of this conventional image processing apparatus is as follows. The head terminal portion 309 is attached to the outside of the scanner head case 300b and connected to the main electric circuit board for controlling the sensor 302 and the illuminating LEDs 306 in the scanner head case 300b via the printed circuit board 305. When a mounting positional error of the scanner head 300 is taken into consideration, it is necessary to give a considerable size to each contact of the head terminal portion 309 and form adequate intervals between these contacts. This increases the width of the head terminal portion 309 to some extent. On the other hand, the width of the printed circuit board 305 is preferably small in order to reduce the influence of noise and external pressure. Therefore, a slit hole is formed in one wall surface of the scanner head case 300b, and the head terminal portion 309 is extracted to the outside of the scanner head case 300b through this slit hole. In this case, however, the extraction hole remains in the wall surface, and light enters through this hole. To solve this problem, the conventional approach is to seal up the extraction hole with a tape or the like, and this is a very tedious operation.

SUMMARY OF THE INVENTION

The present invention has been made in consideration of the above problems, and it is an object of one aspect of the present invention to prevent deformation of a case member caused by, e.g., the existence of a slit opening.

It is an object of another aspect of the present invention to omit complicated steps such as sealing up for light shielding.

It is an object of still another aspect of the present invention to facilitate adjustment (e.g., focus adjustment) of an optical system after assembly.

An electric part according to the first aspect of the present invention is an electric part to be connected to a main apparatus, characterized by comprising a case member having first and second side walls, an electric circuit board placed inside the case member, a terminal board including a terminal to be connected to the main apparatus and placed outside the first side wall, a wiring unit for connecting the electric circuit board and the terminal board through a slit opening formed in the first side wall, and a shield plate, wherein the shield plate couples the first and second side walls.

In the electric part according to the first aspect of the present invention, the shield plate and the terminal board are preferably fixed to the first side wall by a common fixing member.

In the electric part according to the first aspect of the present invention, the fixing member is preferably conductive, and a ground electrode of the terminal board and the shield plate are preferably electrically connected by the fixing member.

In the electric part according to the first aspect of the present invention, the slit opening preferably has a shape to receive at least one of the electric circuit board and the terminal board therethrough.

In the electric part according to the first aspect of the present invention, the electric circuit board, the terminal board, and the wiring unit are preferably connected to each other before being attached to the case member.

In the electric part according to the first aspect of the present invention, the slit opening preferably has a shape which receives the terminal board therethrough, the electric circuit board is preferably attached to the case member after the electric circuit board, the terminal board, and the wiring unit are connected to each other, and after that the terminal board is preferably extracted to the outside of the first side wall through the slit opening and attached to the outside of the first side wall.

In the electric part according to the first aspect of the present invention, the first and second side walls preferably oppose each other.

In the electric part according to the first aspect of the present invention, the case member preferably has an assembly opening used when an internal structure is assembled, and the electric part preferably further comprises a cover member for closing the assembly opening.

In the electric part according to the first aspect of the present invention, the cover member preferably comprises an engaging portion which engages with the slit opening to fix the cover member to the case member, and no unnecessary ambient light preferably enters into the electric part when the engaging portion engages with the slit opening to fix the cover member to the case member.

In the electric part according to the first aspect of the present invention, no ambient light preferably enters through the slit opening when the engaging portion engages with the slit opening to fix the cover member to the case member.

In the electric part according to the first aspect of the present invention, the electric part is preferably used as a scanner head.

In the electric part according to the first aspect of the present invention the main apparatus is preferably capable of mounting a scanner head instead of a printhead, and the electric part is preferably used as the scanner head.

The electric part according to the first aspect of the present invention preferably further comprises an image sensing device, and an optical system for forming an image of an original on the image sensing device.

The electric part according to the first aspect of the present invention preferably further comprises an image sensing device, a first cylindrical member holding a first lens, a second cylindrical member holding a second lens having the same optical axis as the first lens, a third cylindrical member for determining the position of the image sensing device in the direction of the optical axis, a first adjusting mechanism for continuously adjusting and fixing the position of the second cylindrical member with respect to the first cylindrical member along the optical axis, and a second adjusting mechanism for stepwise adjusting and fixing the position of the third cylindrical member with respect to the first cylindrical member along the optical axis, wherein an amount of adjustment by the second adjusting mechanism is preferably determined in accordance with a stepwise selectable pivoting angle of the third cylindrical member around the optical axis, and the first and second adjusting mechanisms are preferably operable from outside the case member.

The electric part according to the first aspect of the present invention preferably further comprises a third adjusting mechanism for fixing the image sensing device to the third cylindrical member by pivoting the image sensing device on the optical axis.

An electric part according to the second aspect of the present invention is an electric part to be connected to a main apparatus, characterized by comprising a case member having a slit opening and an assembly opening used when an internal structure is assembled, an electric circuit board placed inside the case member, a terminal board including a terminal to be connected to the main apparatus and placed outside a side wall of the case member, a wiring unit for connecting the electric circuit board and the terminal board through a slit opening formed in the side wall, and a cover member for closing the assembly opening, wherein the cover member comprises an engaging portion which engages with the slit opening to fix the cover member to the case member, and no unnecessary ambient light enters into the case member through the slit opening when the engaging portion engages with the slit opening to fix the cover member to the case member.

The electric part according to the second aspect of the present invention is preferably used as a scanner head.

In the electric part according to the second aspect of the present invention, the main apparatus is preferably capable of mounting a scanner head instead of a printhead, and the electric part is preferably used as the scanner head.

The electric part according to the second aspect of the present invention preferably further comprises an image sensing device, and an optical system for forming an image of an original on the image sensing device.

An optical part according to the third aspect of the present invention is an optical part for forming an image on an image sensing device, characterized by comprising a first cylindrical member holding a first lens, a second cylindrical member holding a second lens having the same optical axis as the first lens, a third cylindrical member for determining the position of the image sensing device in the direction of the optical axis, an externally operable first adjusting mechanism for continuously adjusting and fixing the position of the second cylindrical member with respect to the first cylindrical member along the optical axis, and an externally operable second adjusting mechanism for stepwise adjusting and fixing the position of the third cylindrical member with respect to the first cylindrical member along the optical axis, wherein an amount of adjustment by the second adjusting mechanism is determined in accordance with a stepwise selectable pivoting angle of the third cylindrical member around the optical axis.

The optical part according to the third aspect of the present invention preferably further comprises a third adjusting mechanism for fixing the image sensing device to the third cylindrical member by pivoting the image sensing device on the optical axis.

The optical part according to the third aspect of the present invention preferably further comprises an electric circuit board for controlling the image sensing device, a connecting portion for connecting the electric circuit board to an external electric circuit, and a case member for accommodating the components, wherein the optical part preferably functions as a scanner head.

The optical part according to the third aspect of the present invention is preferably used in an apparatus capable of mounting a scanner head instead of a printhead.

A processing apparatus according to the fourth aspect of the present invention is characterized by comprising the above-mentioned electric part, and a processor which communicates with the electric part via the above-mentioned terminal board and executes predetermined processing by using the electric part.

A processing apparatus according to the fourth aspect of the present invention is characterized by comprising the above-mentioned optical part, and an image processor which processes an image signal provided by the above-mentioned image sensing device of the optical part.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

As a preferred embodiment of the present invention, an image processing apparatus which can be used as an inkjet printer or a scanner and which uses a detachable scanner head instead of a detachable printhead will be described below.

Figure 2:
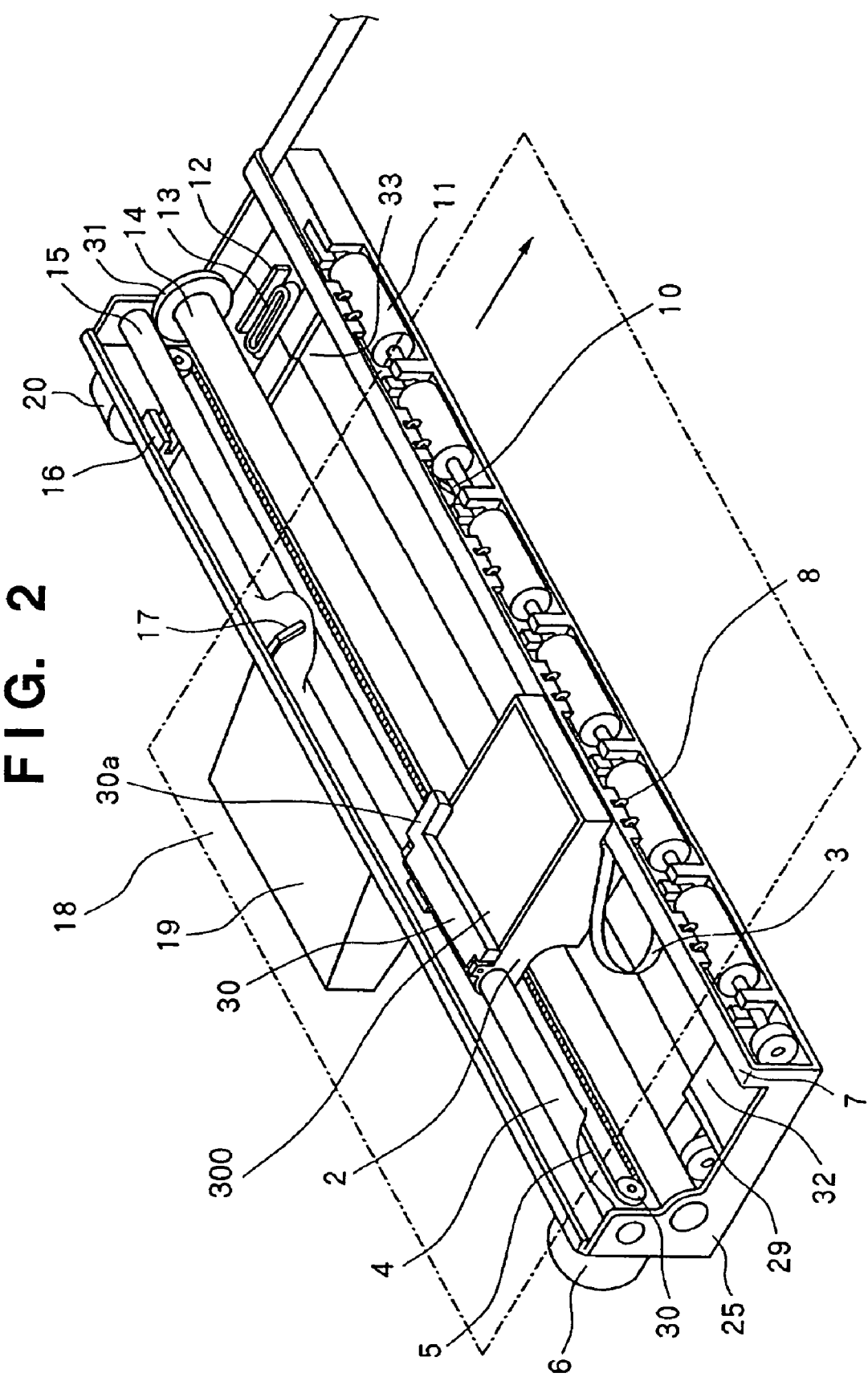
FIG. 2 is a perspective view showing the construction of an image processing apparatus according to the preferred embodiment.
Figure 4:
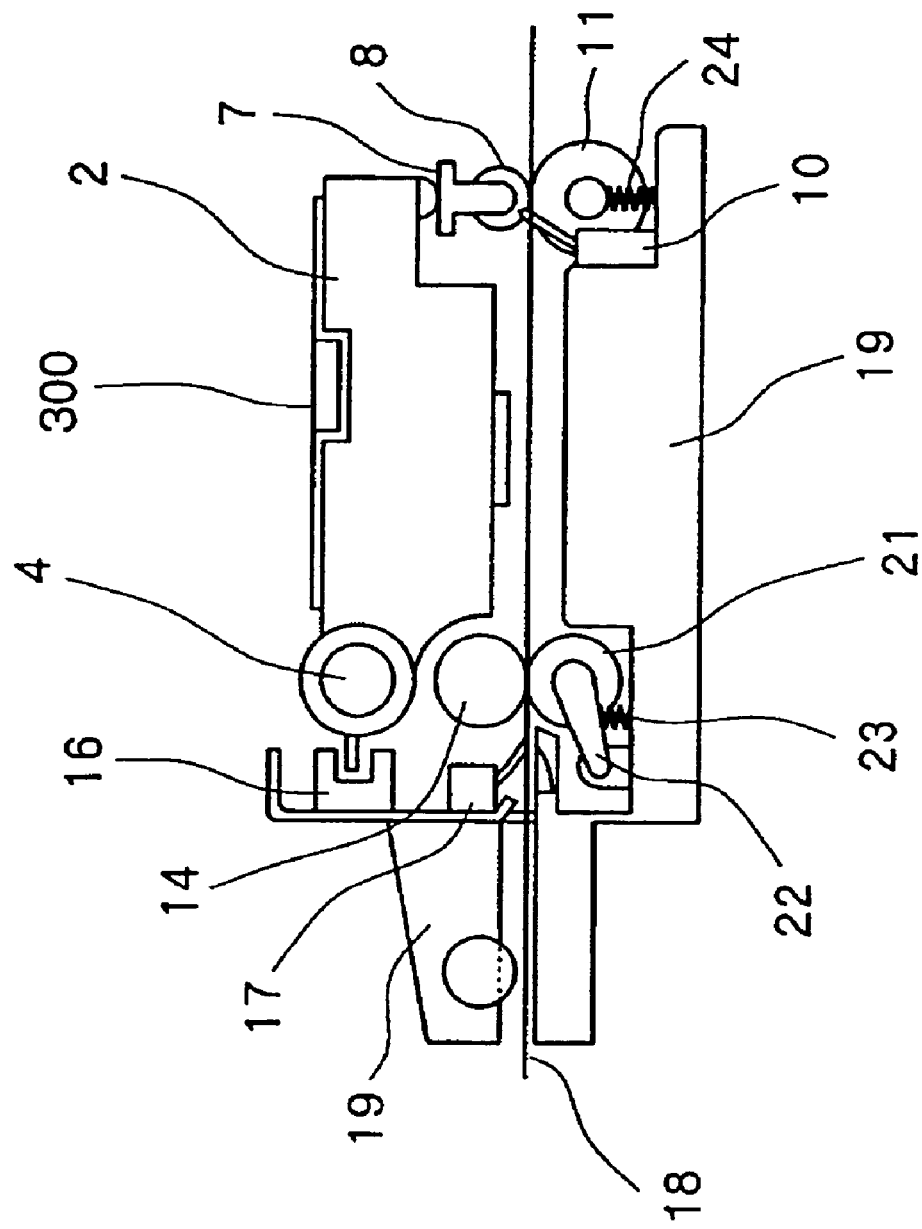
FIG. 4 is a sectional view showing a portion of the image processing apparatus according to the preferred embodiment of the present invention.

FIGS. 2 and 4 are a perspective view and sectional view, respectively, showing a portion of the image processing apparatus according to the preferred embodiment of the present invention. Referring to FIGS. 2 and 4, a carrier 2 selectively holds a detachable printhead 1 or a detachable scanner head 300. This carrier 2 is slidably supported in a direction perpendicular to the conveyance direction of a sheet 18 such as a printing sheet, original, or white reference sheet and parallel to the surface of the sheet 18, by a guide shaft 4 and a guide rail 7 arranged parallel to each other. The two ends of each of the guide shaft 4 and the guide rail 7 are fixed to a frame 25. The carrier 2 is also connected to a portion of a belt 5 looped between a driving pulley 30 rotated by a carrier motor 6 via gears (not shown) and a rotatably supported idle pulley 15. By operating the carrier motor 6, the carrier 2 moves back and forth in the above-mentioned direction.

A home position sensor 16 senses the position of the carrier 2 by sensing its passage. A flexible cable 3 electrically connects the printhead 1 or the scanner head 300 to a control circuit board (not shown) and allows communication between them.

A mechanism for conveying the sheet 18 such as a printing sheet, original, or white reference sheet will be explained below. An automatic sheet feeder 19 conveys a plurality of sheets 18 such as printing sheets or originals one by one to a paper feed roller 14. An LF gear 31 is fixed to this paper feed roller 14 rotatably supported by the frame 25. The paper feed roller 14 is rotated by a paper feed motor 20 via gears (not shown). A pinch roller 21 is urged against the paper feed roller 20 from below by a pinch roller spring 23 via a pinch roller holder 22. The sheet 18 such as a printing sheet, original, or white reference sheet clamped between the paper feed roller 16 and the pinch roller 21 is conveyed by the operation of the paper feed motor 20. A paper delivery roller 11 delivers the sheet 18 such as a printing sheet, original, or white reference sheet after printing. A driving force is transmitted to this paper delivery roller 11 from the paper feed roller 14 via an idle gear 29, so the paper delivery roller 11 rotates in synchronism with the paper feed roller 14. A spur 8 is pressed against the paper delivery roller 11 to convey the sheet 18 such as a printing sheet, original, or white reference sheet by clamping the sheet 18 between itself and the paper delivery roller 11.

A paper sensor 17 senses the presence/absence of the sheet 18 such as a printing sheet, original, or white reference sheet immediately before the paper feed roller 14. A paper delivery sensor 10 senses the presence/absence of a sheet 18 such as a printing sheet, original, or white reference sheet in the vicinity of the paper delivery roller 11.

When this image processing apparatus is used as a printing apparatus, in synchronism with the forward and backward movement of the carrier 2 the printhead 1 discharges ink in accordance with a printing signal, thereby printing an image on the printing sheet 18. The printhead 1 includes fine liquid discharge holes (orifices), a liquid channel, an energy acting portion formed in part of the liquid channel, and an energy generating means for generating droplet formation energy to be exerted on a liquid positioned in the energy acting portion.

Image printing methods are sometimes classified in accordance energy generating means. Examples are a printing method which uses an electromechanical transducer such as a piezoelectric element, a printing method which generates heat by applying an electromagnetic wave such as a laser on a liquid and discharges droplets by an action caused by the heat, and a printing method which discharges droplets by heating a liquid by using an electrothermal transducer such as a heating element having a heating resistor.

In particular, printheads used in an inkjet printing method for discharging droplets by thermal energy can print high-resolution images, because liquid discharge orifices for discharging droplets for printing can be arrayed at high density. Of these printheads, a printhead which uses an electrothermal transducer as an energy generating source can be readily made compact. This facilitates high-density packaging well utilizing the merits of IC technologies and microfabrication technologies which have significantly advanced and improved in reliability in the recent semiconductor fields. Therefore, this printhead is advantageous in low fabrication cost.

Figure 1:
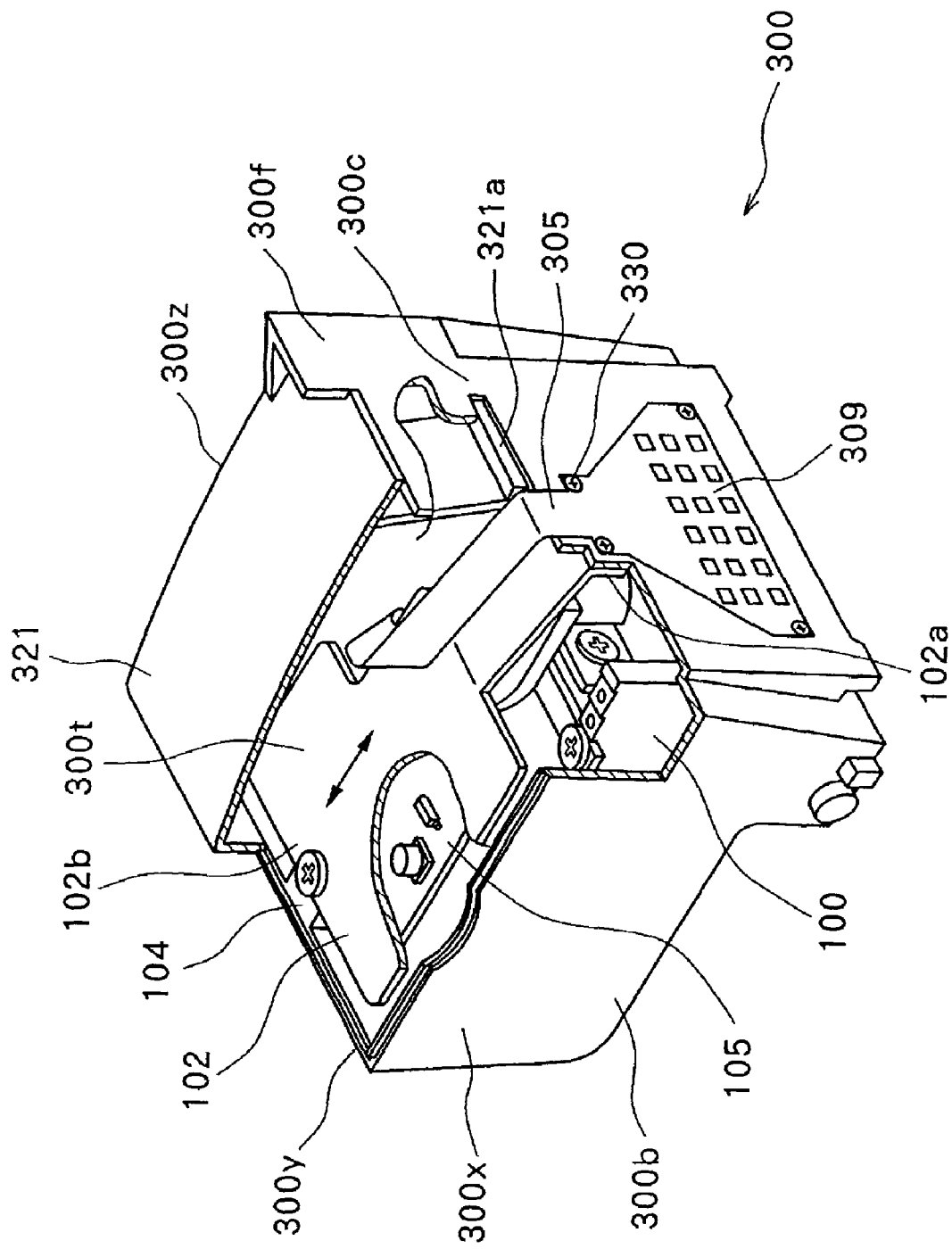
FIG. 1 is a perspective view showing the construction of a scanner head according to a preferred embodiment of the present invention.

When an image of one line or of a predetermined width is printed by the movement of the printhead 1, the printing sheet 18 is conveyed by one line or by the predetermined width in the direction of the arrow as the conveyance direction shown on the printing sheet 18 in FIG. 1 by the paper feed motor 20, and an image is again printed.

Figure 5:
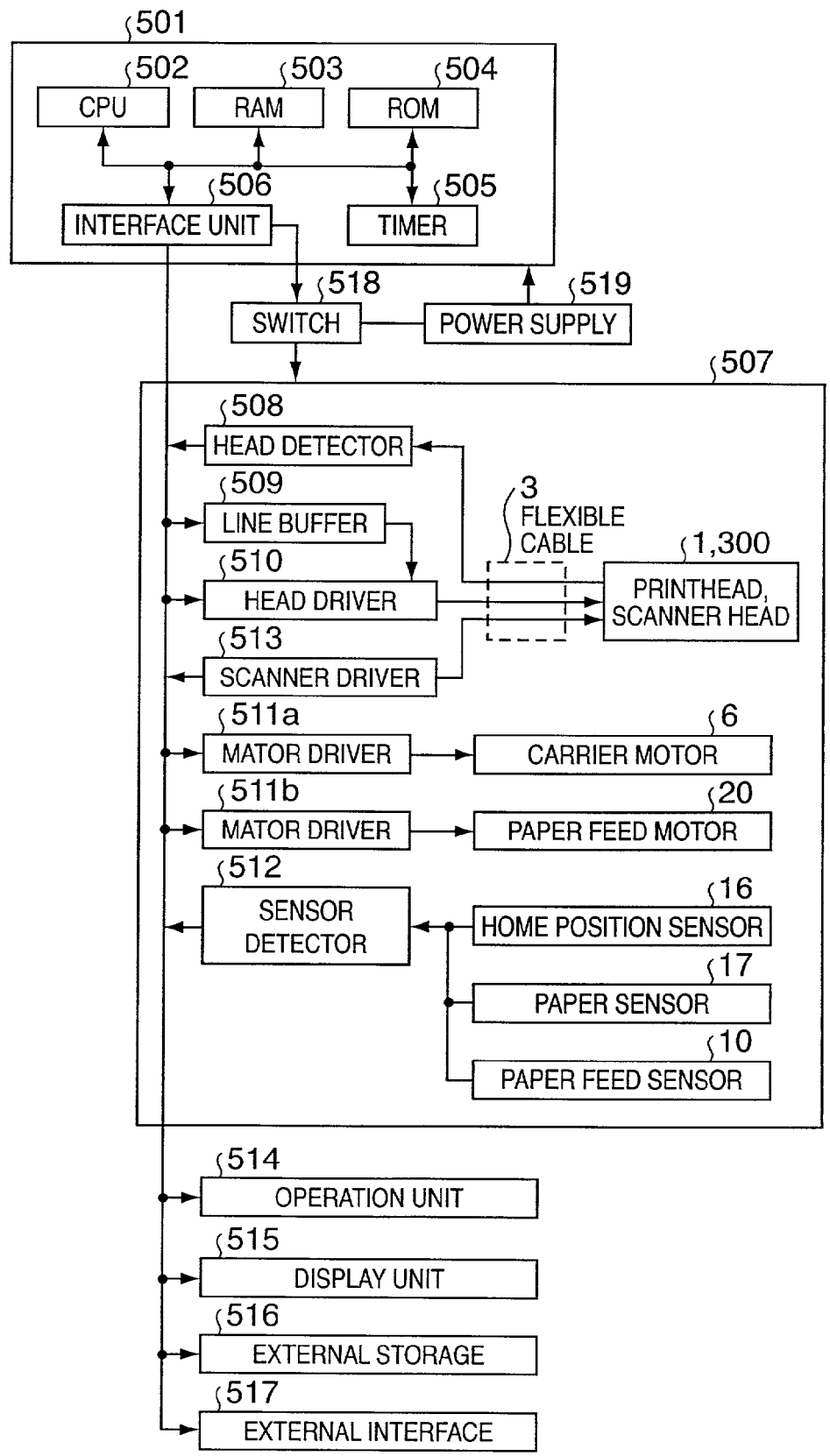
FIG. 5 is a block diagram showing electric circuits of the image processing apparatus according to the preferred embodiment of the present invention.

An operation when this image processing apparatus is used as a scanner by attaching the scanner head 300 to the carrier 2 will be described below with reference to FIG. 5. When the scanner head 300 is attached, a CPU 502 acquires a signal for identifying a printhead/a scanner head via a scanner driver 513. In accordance with this signal, the CPU 502 proceeds on to a scanner mode. The sheet 18 as a reading original or a white reference sheet is conveyed to a predetermined position by the operation of the automatic sheet feeder 19 and the paper feed motor 20. After that, an image is read via the scanner driver 513 while the carrier motor 6 is driven.

When an image of one line or of the predetermined width is completely read, the sheet 18 is conveyed by one line or by the predetermined width by the paper feed motor 20, and the next reading is executed. This operation is repeated until the reading is completed. The completely read sheet 18 is delivered.

A cap 13 for protecting the liquid discharge orifices of the printhead 1 from drying is present at one end of the moving range of the carrier 2. When the carrier 2 is in the home position, this cap 13 is pushed against the printhead 1 by the paper feed motor 20 and a power transmitting mechanism (not shown). Also, ink suction for cleaning the liquid discharge orifices is executed in this position. A blade 12 for cleaning the liquid discharge orifice surface of the printhead 1 is placed near the cap 13. A link mechanism (not shown) cleans this liquid discharge orifice surface in accordance with the operation of the carrier 2. Consequently, foreign matter such as dust sticking to the vicinity of the nozzles on the discharge orifice surface is removed to allow normal printing at all times (wiping). When the scanner head 300 is mounted on the carrier 2, however, it is necessary to prevent these capping and wiping. Therefore, the surface of the scanner head 300, which opposes the cap and the blade is positioned farther from the cap 13 and the blade 12 than the printhead 1.

The configuration of electric circuits of the image processing apparatus according to the preferred embodiment will be described with reference to FIG. 5. In FIG. 5, reference numeral 501 denotes a logic controller for performing main control: 502, a CPU (e.g., a microcomputer) for executing programs; 503, a RAM which provides an area for expanding document data and image data and a work area; 504, a ROM storing programs to be provided for the CPU 502 and fixed data such as font data; 505, a timer for providing timings necessary for printing and reading; and 506, an interface unit for connecting the CPU 502 to peripheral devices (e.g., 507).

Reference numeral 507 denotes an operation unit which operates as an image printing unit or a scanner unit; 508, a head detector for detecting information of the head on the basis of outputs from various sensors for sensing, e.g., the presence/absence of the head (the printhead 1 or the scanner head 300), the type of the head, the temperature of the printhead 1, and the presence/absence of ink in the printhead 1; 509, a line buffer for storing print data for controlling the printhead 1; 510, a head driver for supplying a print signal, electric power, and the like to the printhead 1; 511a and 511b, motor drivers for supplying signals, electric power, and the like necessary to drive the carrier motor 6 and the paper feed motor 20, respectively; 512, a sensor detector for detecting outputs from sensors such as the home position sensor 16, the paper sensor 17, and the paper delivery sensor 10; and 513, a scanner driver for controlling the scanner head 300 when the scanner head 300 is mounted instead of the printhead 1. Signals are transmitted between the head detector 508, the header driver 510/scanner driver 513, and the printhead 1/scanner head 300 via the flexible cable 3.

Reference numeral 514 denotes an operation unit including a power switch, head exchange switch for head exchange, and the like; 515, a display unit for displaying the condition of the image processing apparatus; 516, an external storage device (e.g., an FDD, HDD, or RAM card); and 517, an external interface (e.g., a centronics port or RS232C port) for communicating with other information processing apparatuses. For example, this external interface 517 receives a command which designates printing or original reading from an external controller.

A power supply 519 constantly supplies electric power to the logic controller 501, thereby permitting the CPU 502 to monitor input signals from the operation unit 514 and the external interface 517 via the interface unit 506. Also, the power supply 519 supplies electric power to the operation unit 507 via a switch 518 controlled by the CPU 502 via the interface unit 506. This power supply 519 is supplied with electric power from an AC power supply or a battery (neither is shown).

Figure 3:
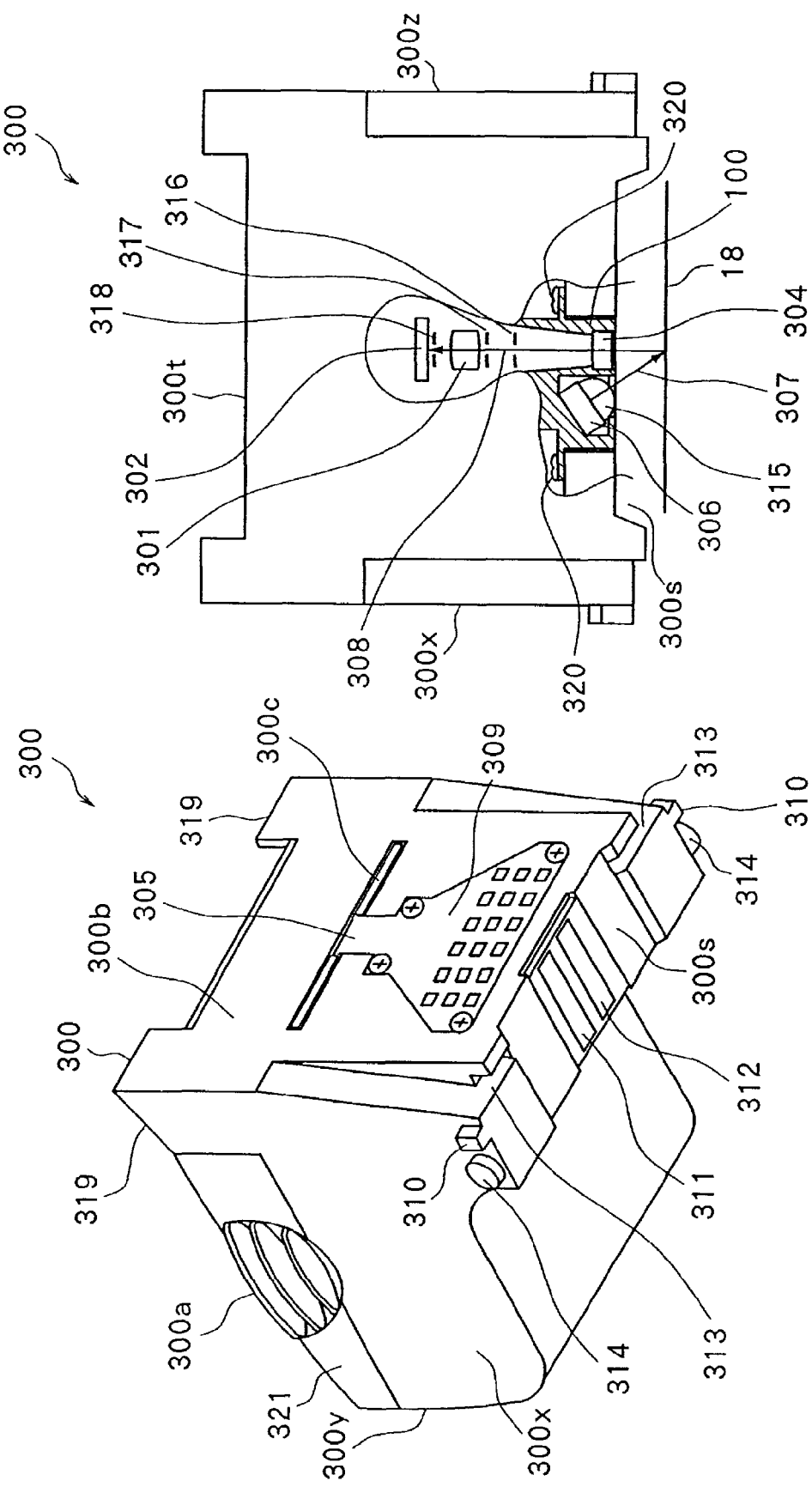
FIGS. 3A and 3B are a perspective view and sectional view, respectively, showing the construction of the scanner head according to the preferred embodiment of the present invention.

FIGS. 3A and 3B are a perspective view and sectional view, respectively, showing an outline of the construction of the scanner head 300. In FIGS. 3A and 3B, reference numeral 306 denotes LEDs for illuminating the original surface 18. To perform color reading, LEDs of three colors, red, green, and blue, are arranged. LED light 307 emitted from the LEDs 306 illuminates the original surface 18 through a condenser lens 315 and an LED opening 311. Image light (reflected light) 308 from the original surface 18 passes through a field lens 304 placed in a sensor opening 312, and further passes through a light amount correction stop 316, a light amount regulation stop 317, an image forming lens 301, and a stray light shielding stop 318, forming an image on the sensor 302. A 256-pixel linear image sensor is an example of this sensor 302.

The light amount correction stop 316 has a hole which looks like a spool when viewed in the optical axis direction of the image light 308. This light amount correction stop 316 narrows light in the central portion and directly passes light in the peripheral portion, thereby reducing a light amount difference between the central portion and the peripheral portion.

The light amount regulation stop 317 determines the final light amount to be fed into the sensor 302. The size of the aperture of this light amount regulation stop 317 is determined by the relationship between the light amount of the LEDs 306 and the sensitivity of the sensor. The aperture shape is a circle.

The image light 308 leaving the image forming lens 301 passes through the stray light shielding stop 318 before entering the sensor 302. This shields light except for the image light 308 to be incident on the sensor 302 and thereby helps improve the quality of the read image. The shape of this stray light shielding stop 318 is a slit suited to the shape of the light receiving portion of the sensor 302.

All the lenses and stops described above are incorporated into one scanner unit 100. Details will be described later.

The LEDs 306 and the sensor 302 are connected to a main electric circuit board 105 for controlling these components. A control signal line of this main electric circuit board 105 is extracted to the outside from a printed circuit board 305. One or a plurality of electrodes (terminals) are formed on a head terminal portion (terminal board) 309 of the printed circuit board 305. The head terminal portion 309 is brought into tight contact with and thereby electrically connected to electrodes (terminals) of the carrier 2 (FIG. 2). This allows the head terminal portion 309 to communicate with circuits (e.g., the scanner driver 513 in FIG. 5) of the main body.

The scanner head 300 has a shape compatible with the shape of the cartridge printhead 1. Similar to the printhead 1, this scanner head 300 is fitted in the carrier 2 on the basis of positioning bosses 310 and positioning notches 313. The scanner head 300 is attached by latching a tight contact portion 319 as a part of a scanner head 300b by the latching member 30 (FIG. 2) of the carrier 2. This tight contact portion 319 is released from the latch by raising an arm 30a of the latching member 30, making the scanner head 300 removable.

When the scanner head 300 is attached to the carrier 2, the CPU 502 (FIG. 5) reads out a signal for identifying a printhead/a scanner head from the printed circuit board 305 via the scanner driver 513 (FIG. 5), thereby passing on to a scanner mode.

When an original read command is input from the external interface 517, the CPU 502 (FIG. 5) operates the automatic sheet feeder 19 and the paper feed motor 20 to convey the original 18 to a predetermined position. After turning on the LEDs 306, the CPU 502 reads an image of the original 18 via the scanner driver 513 while driving the carrier motor 6.

In accordance with the original read mode of the scanner head 300, the driving speed of the carrier motor 6 can be changed. This mode is determined by the combination of the read resolution and the read tone. This image processing apparatus has a resolution of 600 dpi in the main scan direction. In the sub-scan direction, the sensor 302 of the scanner head 300 has a resolution of 600 dpi, and an output of 256 grayscale levels can be obtained. Accordingly, it is possible to designate from reading of 600 dpi in the main scan direction, 600 dpi in the sub-scan direction, and 256 grayscale levels to reading of 75 dpi in the main scan direction, 75 dpi in the sub-scan direction, and two grayscale levels. The image processing apparatus also has a facsimile-compatible mode in which it reads with a resolution of 200 dpi in the main scan direction. For example, in a mode in which the data amount is large such as in reading of 600 dpi in the main scan direction, 600 dpi in the sub-scan direction, and 256 grayscale levels, data processing and transfer require a long time, so the carrier driving speed is lowered. On the other hand, the carrier driving speed is raised in reading of 75 dpi in the main scan direction, 75 dpi in the sub-scan direction, and two grayscale levels. To read a color original, the above operation is repeated three times, i.e., performed once for each of the LEDs of three colors.

When one line is completely read, the original 18 is conveyed by one line by the paper feed motor 20, and the next line is read. This operation is executed until the whole original is completely read.

The standby position of the carrier 2 when the scanner head 300 is attached to the carrier 2 need not be the same as the position when the printhead 1 is attached. Also, a reading unit surface 300s of the scanner head 300 can be separated from recovery portions (the blade 12 and the cap 13) for maintaining the printhead 1, thereby placing the standby position on these recovery portions. In this case, a movable zone produced by this arrangement can be used as an idling zone for increasing the running stability of the carrier 2.

The white reference sheet 18 suitable for this image processing apparatus has reference reflectance with a reflection density of 0.1 or less. To correct variations in the sensitivities and received light amounts of the individual pixels of the sensor 302, the white reference sheet 18 is read under the same conditions as an original. The interval between a white reference signal obtained from each sensor pixel by this operation and a signal (black reference) when no light is received by the sensor is divided by a desired number of grayscale levels. In this manner, tone which absorbs variations between the sensor pixels can be determined.

Analogous to the printing sheet or original 18, the white reference sheet 18 is set as shown in FIG. 4. The CPU 502 moves the carrier 2 mounting the scanner head 300 to the position above the white reference sheet 18, and loads a signal from the sensor 302 while turning on the LEDs 306, thereby acquiring white reference data. After the white reference data is acquired, the white reference sheet 18 is delivered.

Figure 6:
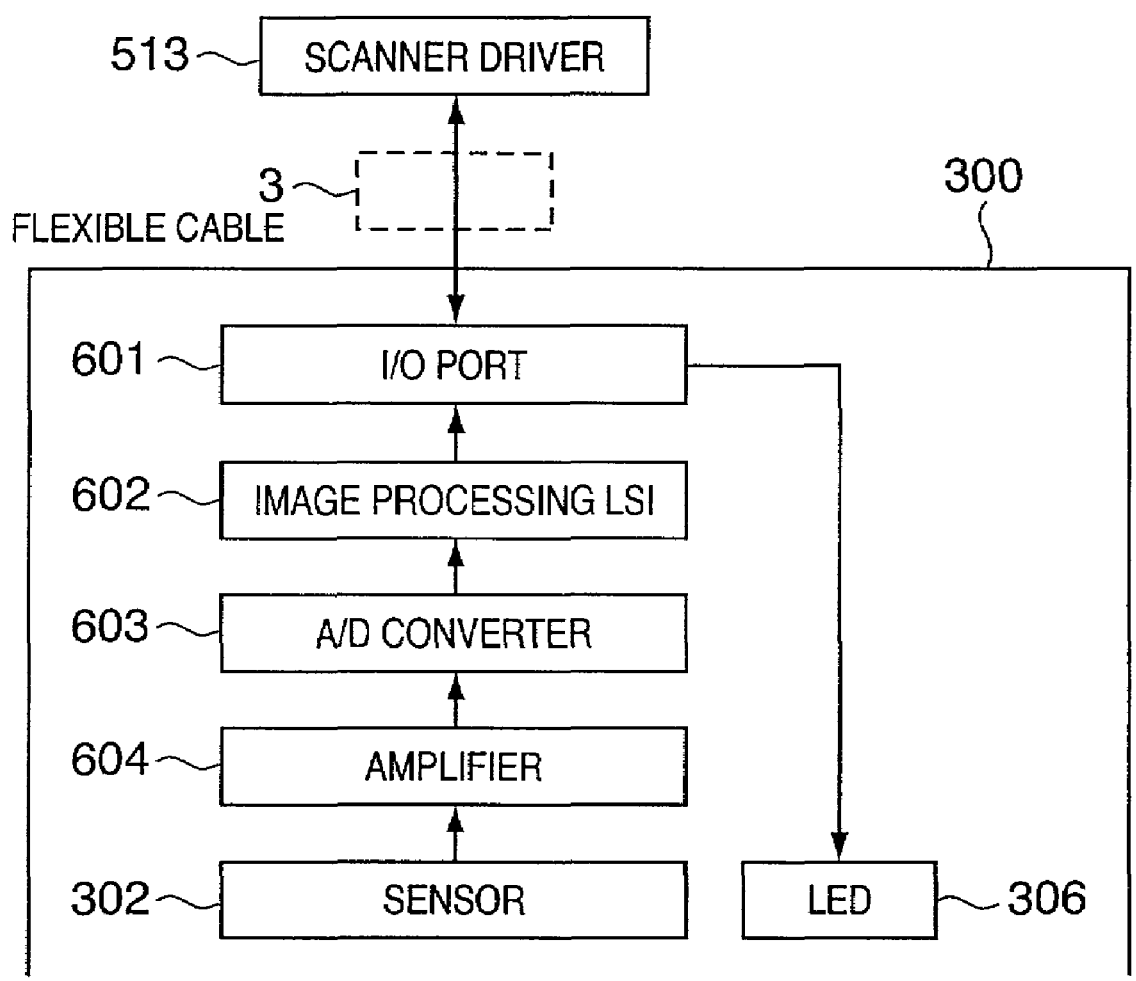
FIG. 6 is a block diagram showing electric circuits of the scanner head according to the preferred embodiment of the present invention.

FIG. 6 is a block diagram of electric circuits of the scanner head 300. The scanner head 300 will be described below with reference to FIGS. 2, 5, and 6. When this scanner head 300 is mounted on the carriage 2, the head terminal portion 309 of the scanner head 300 is urged against the electrodes (terminals, not shown) formed at that end of the flexible cable 3, which is connected to the carriage 2. In this way, the scanner head 300 is electrically connected to the operation unit 507.

The operation unit 507 and the scanner head 300 communicate data and commands to each other via the scanner driver 513 of the operation unit 507 and an I/O port 601 of the scanner head 300.

The image light 308 from the original 18 illuminated by the LEDs 306 is converted into an electrical image signal by the sensor 302 having photoelectric conversion characteristics. This image signal sensed by the sensor 302 is amplified to a level matching an analog-to-digital (A/D) converter 603 by an amplifier 604, and supplied to the A/D converter 603. The image data converted into digital data by this A/D converter 603 is subjected to image processing such as shading correction and binarization by an image processing LSI 602, and transferred to the operation unit 507 via the flexible cable 3.

The white reference data of each pixel of the sensor 302, obtained by reading the white reference sheet 18, is stored in an internal register of the image processing LSI 602 and used in each processing during original reading.

Figure 7:
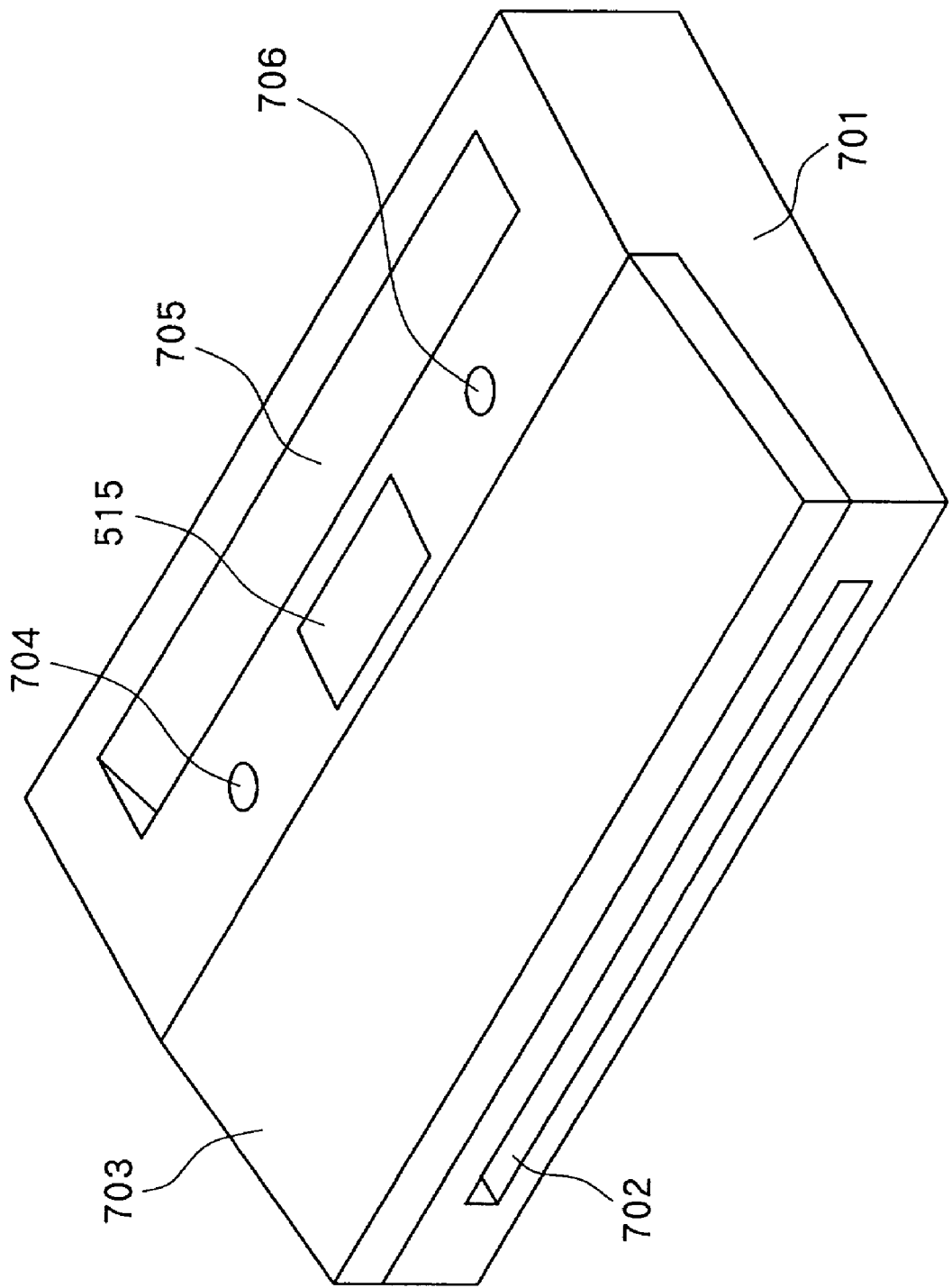
FIG. 7 is a view showing the outer appearance of the image processing apparatus according to the preferred embodiment of the present invention.

FIG. 7 is a perspective view showing the outer appearance of the image processing apparatus according to the preferred embodiment of the present invention. Reference numeral 701 denotes the image processing apparatus; 702, a sheet delivery port for delivering the sheet 18 such as a printing sheet, original, or white reference sheet; 703, a cover which is opened when the printhead and the scanner head are exchanged or during maintenance; and 704, a power switch which forms a part of the operation unit 514 shown in FIG. 5. The CPU 502 monitors the state of this power switch 704. When power ON is indicated, the CPU 502 controls the switch 518 via the interface unit 506 to start supplying power to the operation unit 507. The display unit 515 displays the status of the image processing apparatus. Reference numeral 705 denotes a sheet feed port for feeding the sheet 18 such as a printing sheet, original, or white reference sheet. The fed sheet 18 is guided to the automatic sheet feeder 19 shown in FIG. 2. Reference numeral 706 denote a head exchange switch which is operated when the printhead 1 and the scanner head 300 are exchanged. When this head exchange switch 706 is pressed, the carrier 2 is moved to a position where the printhead 1 and the scanner head 300 are readily exchanged.

FIG. 1 is a view illustrating the characteristic feature of the scanner head 300 according to the preferred embodiment of the present invention. Referring to FIG. 1, a cover 321 is partially cut away. The scanner head case 300b has a boxy shape having one open side. This scanner head case 300b is composed of walls 300x, 300y, and 300z forming three side surfaces, an opening 300t corresponding to one upper virtual surface, the wall (reading unit surface) 300s having a substantially square hole and forming one lower surface, and a wall 300f having a slit hole (opening) 300c and forming one side surface. The scanner unit 100 containing the lenses, light source, and the like is fitted in the square hole formed in the reading unit surface 300s and fixed to the scanner head case 300b by a fixing member.

The main electric circuit board 105 is also fixed to the scanner head case 300b. A shield plate 102 is fixed to the opening 300t so as to cover the scanner unit 100 and the main electric circuit board 105. A connecting portion A 102a as one end of the shield plate 102 is so bent as to be parallel to the wall 300f having the slit hole 300c and fixed together with the head terminal portion 309 to the wall 300f by a fixing member (e.g., a screw) 330. The shield plate 102 is a metal plate. The fixing member 330 is conductive and electrically connects an electrical ground portion of the head terminal portion 309 to the shield plate 102, thereby determining the electrical ground level of the shield plate 102. An actual connecting operation is performed after adjustments (to be described later) are completed.

A connecting portion B 102b as the other end of the shield plate 102 is fixed to a rib 104 vertically protruding from the wall 300y by a fixing member such as a screw. With respect to the rib 104, the connecting portion B 102b can be adjusted in a direction (the direction of an arrow in FIG. 1) perpendicular to the wall 300y and the wall 300f having the slit hole 300c. This connecting portion B 102b is fixed to the rib 104 while absorbing dimensional variations of individual components. Since this shield plate 102 couples the wall 300y and the opposing wall 300f, it is possible to provide the scanner head 300 rigid as a whole regardless of a lowering in the strength of the scanner head case 300b caused by the existence of the slit hole 300c.

Figure 12:
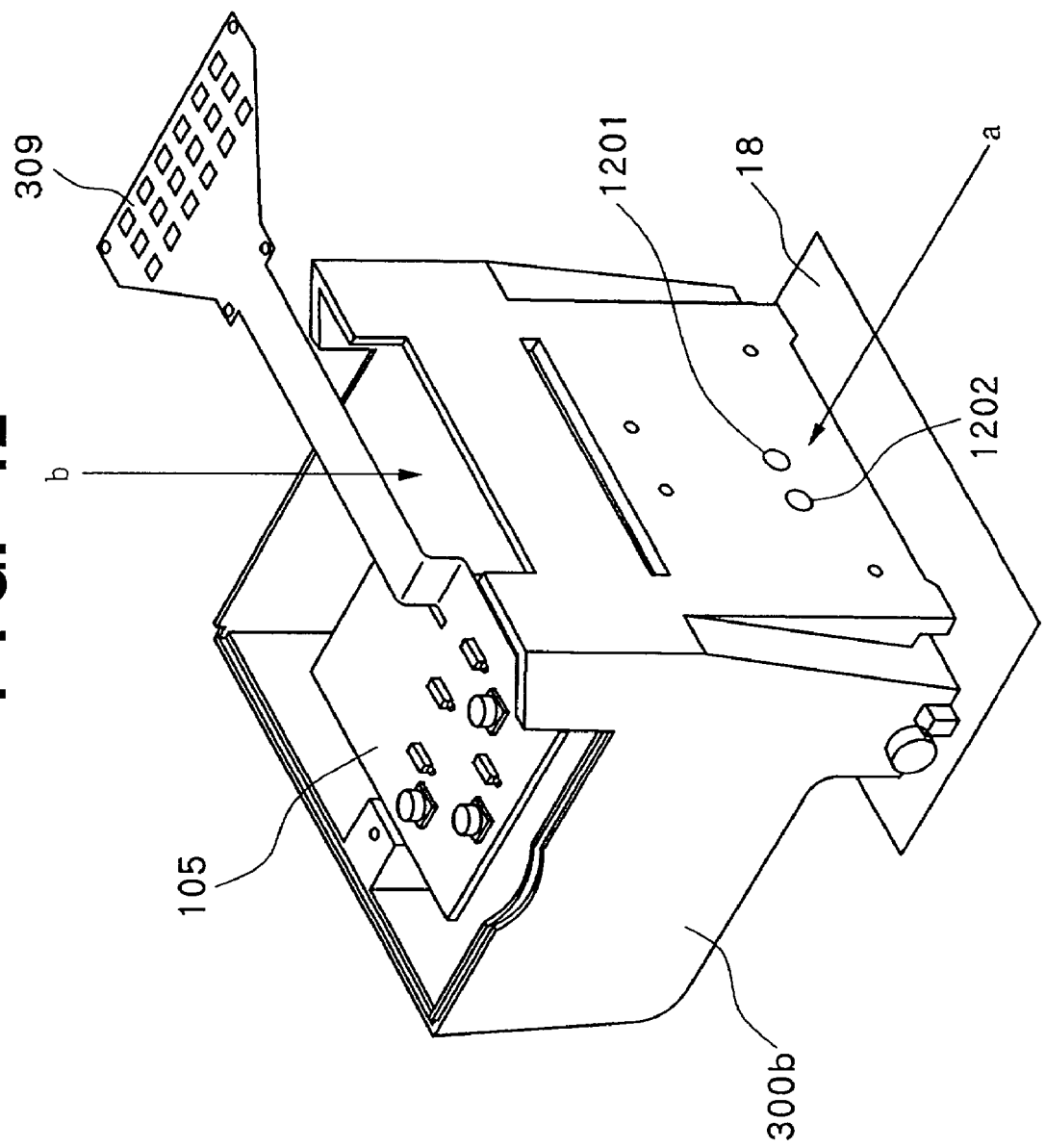
FIG. 12 is a view for explaining the operation of adjusting the scanner head according to the preferred embodiment of the present invention.

The printed circuit board 305 connecting the main electric circuit board 105 and the head terminal portion 309 is so bent as to extend from the lower to the upper side of the shield plate 102, when viewed from the main electric circuit board 105. The printed circuit board 305 is then directed to the outside of the scanner head case 300b through the slit hole 300c to reach the head terminal portion 309. The main electric circuit board 105, the head terminal portion 309, and the printed circuit board 305 are attached to the scanner head case 300b as they are coupled with each other (FIG. 12). More specifically, the main electric circuit board 105 is first attached to the scanner head case 300. After that, the head terminal portion 309 is extracted to the outside of the scanner head case 300 through the slit hole 300c and attached to the scanner head case 300b. Accordingly, the slit hole 300c has a shape which receives at least one of the main electric circuit board 105 and the head terminal portion 309, preferably the head terminal portion 309 therethrough.

The peripheral portion of the cover 321 for closing the opening 300t closely fits in the end portion (flange) of each of the walls 300x, 300y, 300z, and 300f forming the four side surfaces of the scanner head case 300b, thereby preventing ambient light from entering the inside through the connecting portions between the cover 321 and the four side surfaces of the scanner head case 300b. Also, the cover 321 has an elastic cover latch 321a which closely fits in a portion (gap) of the slit hole 300c except for a portion for passing the printed circuit board 305, thereby fixing the cover 321 to the scanner head case 300 and preventing light from entering the inside through the slit hole 300c.

Figure 9:
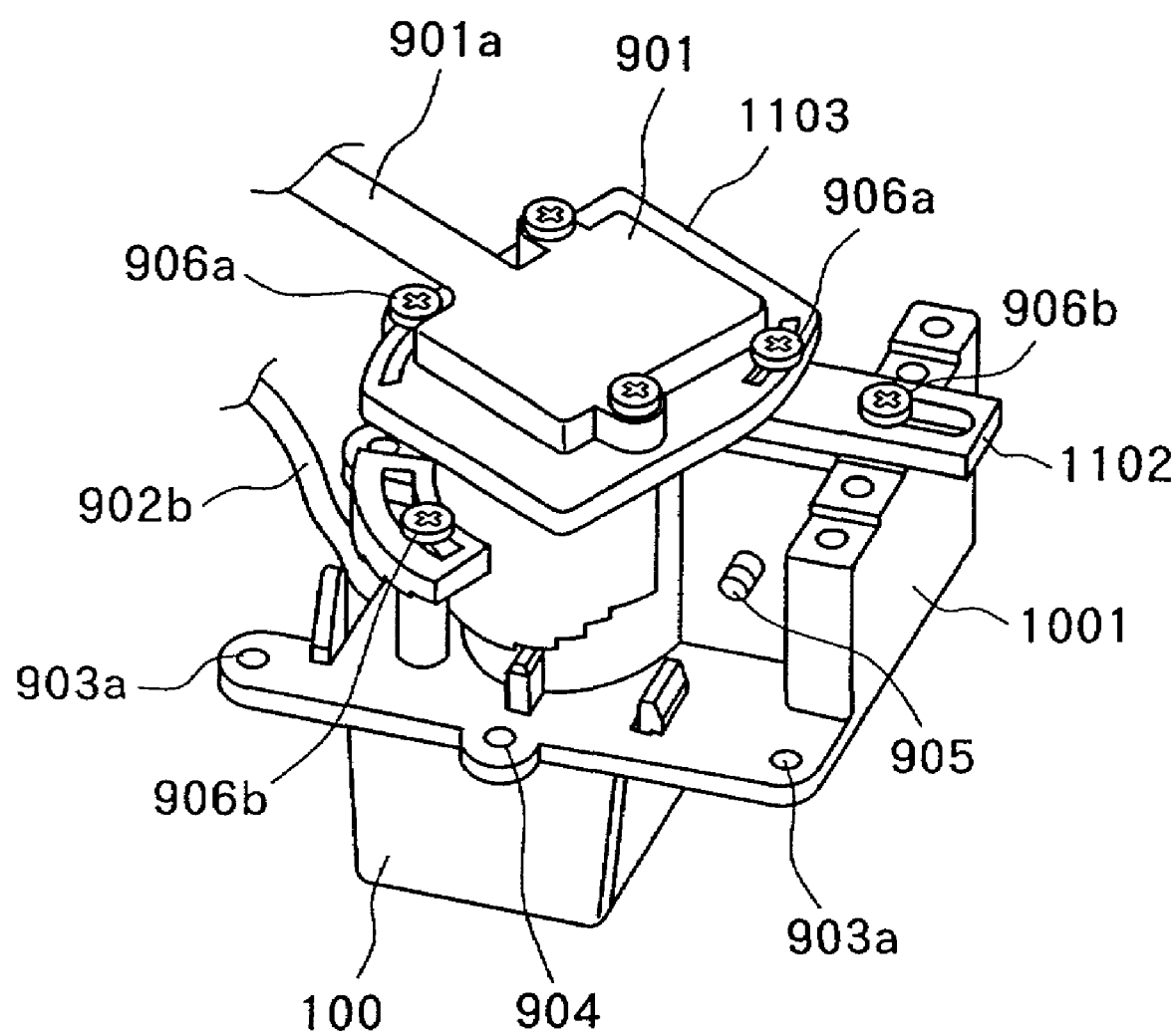
FIG. 9 is a perspective view showing the outer appearance of a scanner unit incorporated into the scanner head according to the preferred embodiment of the present invention.

The scanner unit 100 will be explained below. FIG. 9 is a perspective view showing the outer appearance of the scanner unit 100. A sensor board 901 on which the sensor 302 is mounted is connected to the main electric circuit board 105 via a sensor line 901a. The LEDs 306 are connected to the main electric circuit board 105 via an LED line 902a. This scanner unit 100 is attached to the scanner head case 300b by fixing members such as screws by using holes 903a and 903b.

Figure 10:
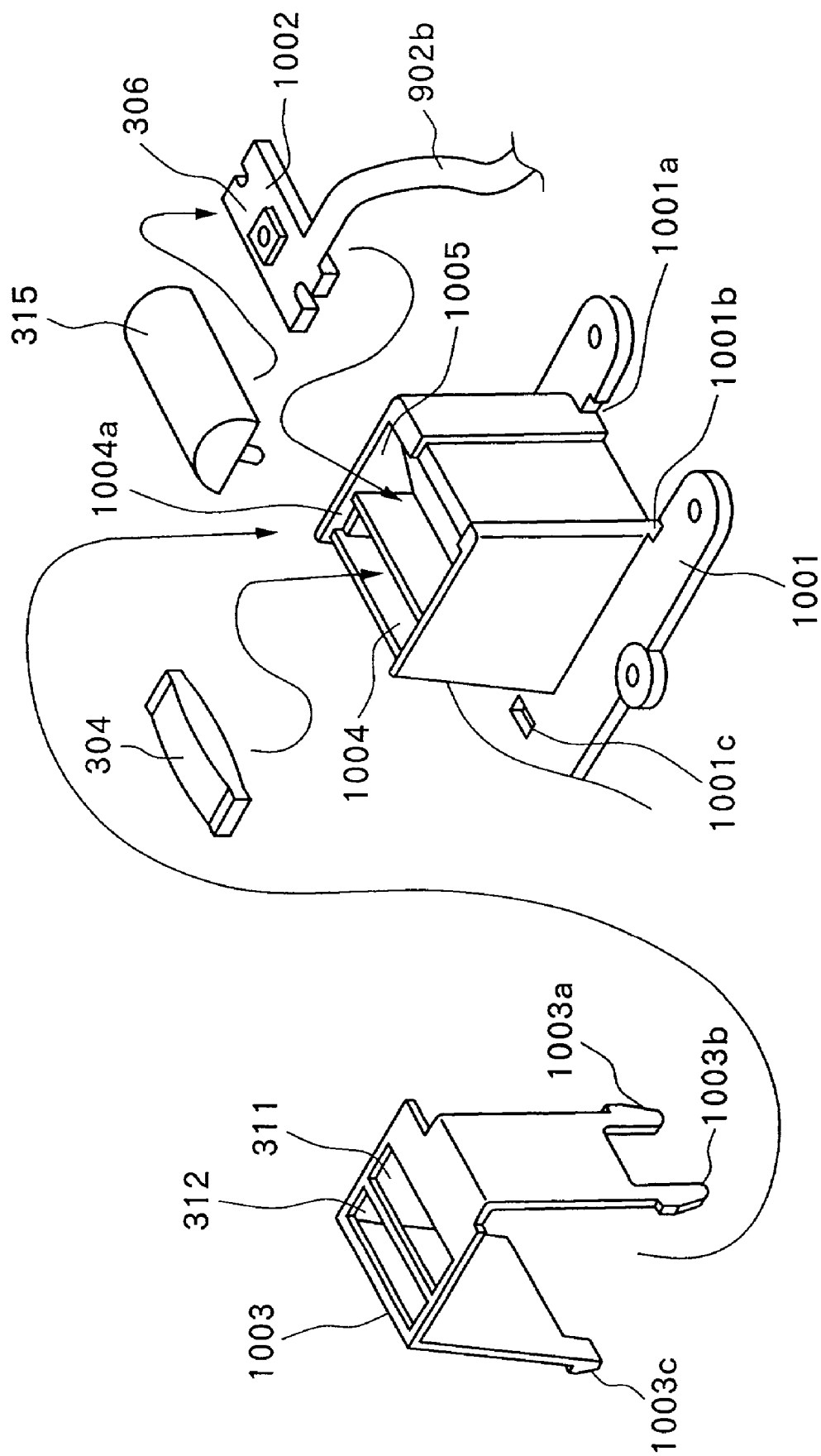
FIG. 10 is a view showing the structure and the method of assembly of the scanner unit viewed from a field lens.

FIG. 10 is a view showing the structure and the method of assembly of the scanner unit 100 viewed from the field lens 304. This field lens 304 of a plurality of lenses is accommodated into a recess 1004a formed in one end face of a second path 1004 defined in a second lens barrel 1001. The LEDs 306 are mounted on an LED board 1002 and accommodated together with the condenser lens 315 in a recess 1005 partitioned by a wall on the side of the second path 1004. The condenser lens 315 is positioned with respect to the LED board 1002 by a positioning boss. The LED board 1002 is fitted in the recess 1005 and positioned by its outer dimensions. Removal of the field lens 304 and the condenser lens 315 is prevented by placing a cover plate 1003. This cover plate 1003 is fixed by engaging latches 1003a, 1003b, and 1003c with recesses 1001a, 1001b, and 1001c, respectively, in the second lens barrel 1001. The cover plate 1003 has the LED opening 311 and the sensor opening 312 through which the original surface 18 is irradiated with the LED light 107 and the image light 308 is incident.

Figure 11:
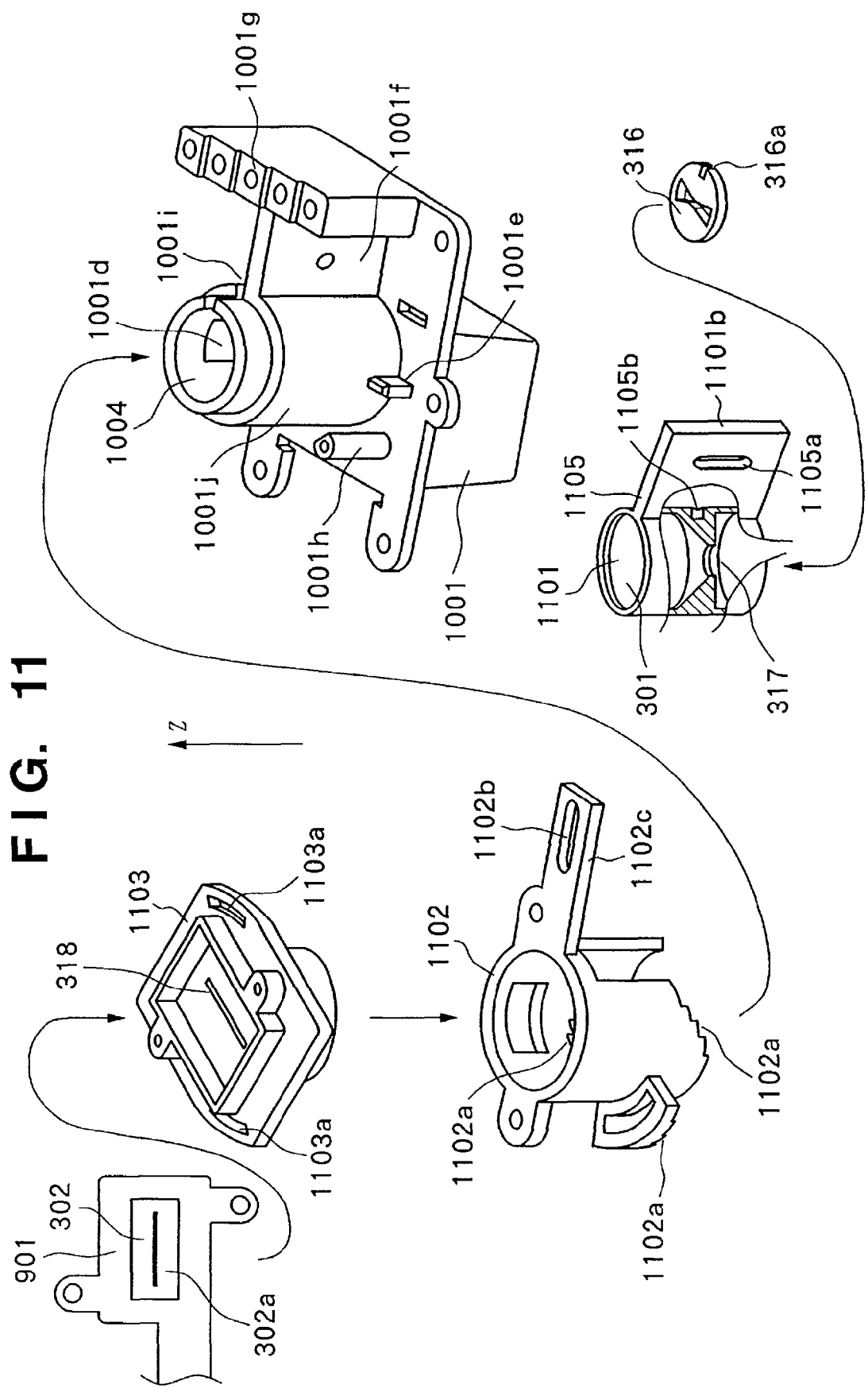
FIG. 11 is a view showing the structure and the method of assembly of the scanner unit viewed from a sensor.

FIG. 11 is a view showing the structure and the method of assembly of the scanner unit 100 viewed from the sensor 302. The optical axis explained below matches the central line of a cylindrical shape of the second path 1004, and matches the direction of an arrow Z in FIG. 11. The sensor 302 is mounted on the sensor board 901 which is attached to a sensor holding plate 1103. This sensor holding plate 1103 has the stray light shielding stop 318. When the sensor 302 is attached, a light receiving portion 302a of the sensor 302 is so adjusted as to overlap the stray light shielding stop 318.

The sensor holding plate 1103 is temporarily fixed to a sensor distance adjusting cylinder 1102 by using a long hole 1103a and a fixing member such as a screw, so that this sensor holding plate 1103 can rotate around the cylindrical portion of the second path 1104 and the optical axis when incorporated into the second lens barrel 1001 such that the center of the stray light shielding stop 318 matches the central line of the cylindrical shape of the second path 1004. The long hole 1103a is used as an adjustment margin during rotation adjustment.

Figure 8:
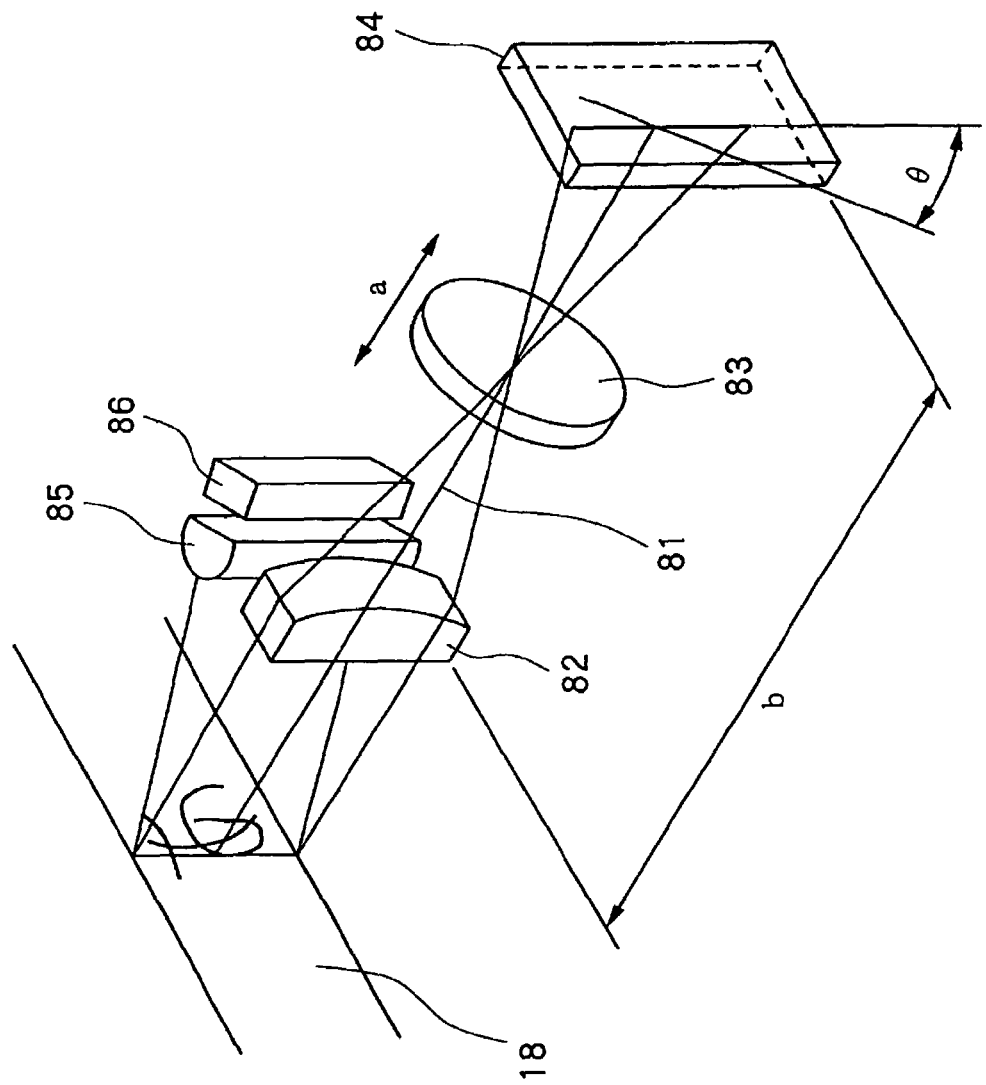
FIG. 8 is a view showing the optical configuration of a general scanner unit.

In a first path 1101 in a first lens barrel 1105, the image forming lens 301 and the light amount regulation stop 317 are arranged. In addition, the light amount correction stop 316 is attached from the side of the light amount regulation stop 317. The light amount correction stop 316 has a hole which looks like a spool when viewed in the optical axis direction of the image light 308. This light amount correction stop 316 narrows light in the central portion and directly passes light in the peripheral portion, thereby reducing a light amount difference between the central portion and the peripheral portion. The light amount correction stop 316 has a positioning recess 316a for matching the axis in the longitudinal direction of the opening in the light amount correction stop 316 with the light receiving portion 302a of the sensor. Note that this light amount correction stop 316 can also be integrated with the first lens barrel 1105. The first lens barrel 1105 has a rotation stop plate 1101b. By inserting this rotation stop plate 1101b into a rotation stop slit 1001i of the second lens barrel 1001, the first lens barrel 1105 is housed in the second path 1004 of the second lens barrel 1001 so as to be movable only in the optical axis direction. This first lens barrel 1105 is attached to a stop hole 1101f in the second lens barrel 1001 by using a long hole 1105a and a fixing member such as a screw. By using a relief hole 1001d in the second lens barrel 1001, it is possible to externally contact an adjusting hole 1105b in the first lens barrel 1105. The optical axis direction can be adjusted by attaching a jig to this portion. This adjustment corresponds to adjustment denoted by reference symbol a in FIG. 8.

The sensor distance adjusting cylinder 1102 is fitted inside an outer cylinder wall 1001j of the second lens barrel 1001 so as to be movable in the optical axis direction and rotatable. When the sensor distance adjusting cylinder 1102 is thus fitted, the sensor holding plate 1103 is fitted in the cylindrical portion 1001j of the second path 1004 so as to be movable in the optical axis direction and rotatable.

Stepped ribs 1102a and an adjusting arm 1102c of the sensor distance adjusting cylinder 1102 are brought into contact with an adjust rib 1001e, a connecting post 1001h, and stepped holes 1001g of the second lens barrel 1001. The stepped ribs 1102a and the stepped holes 1001g have a plurality of steps having a predetermined step difference at each predetermined angle around the optical axis. In this embodiment, five 0.15-mm steps are formed at an angular interval of 7.5°. When the sensor distance adjusting cylinder 1102 is incorporated into the second lens barrel 1001, the adjust rib 1001e and the connecting post 1001h are brought into contact with the stepped ribs 1102a, and the stepped holes 1001g and the adjusting arm 1102c are brought into contact with each other. When in this state the sensor distance adjusting cylinder 1102 is rotated 7.5° around the optical axis with respect to the second lens barrel 1001, this sensor distance adjusting cylinder 1102 moves parallel to the optical axis direction by 0.15 mm with respect to the second lens barrel 1001. Since the sensor holding plate 1103 having the sensor 302 mounted on it is connected to the sensor distance adjusting cylinder 1102, this sensor holding plate 1103 also moves in the optical axis direction in collaboration with the above rotation. This movement corresponds to adjustment denoted by reference symbol b in FIG. 8 and can be performed independently of the adjustment (denoted by reference symbol a in FIG. 8) of the first lens barrel 1105. After the adjustment is completed, the sensor distance adjusting cylinder 1102 is fixed to the second lens barrel 1001 by a fixing member such as a screw by using a long hole of the stepped rib 1102a, the connecting post 1001h, a long hole 1102b of the adjusting arm 1102c, and a corresponding one of the stepped holes 1101g. Holes in the stepped ribs 1102a are formed at an angular interval of 7.5°.

In the assembled state as described above, the first lens barrel 1105 can be moved in a direction parallel to the optical axis with respect to the second lens barrel 1001. Also, the sensor 302 can be rotated around the optical axis by pivoting the sensor holding plate 1103 and can be moved parallel to the optical axis by pivoting the sensor distance adjusting cylinder 1102.

FIG. 9 is a view showing the assembled scanner unit 100. This scanner unit 100 is incorporated into the scanner head case 300b and fixed by screws 320 (FIG. 3B).

Subsequently, as shown in FIG. 12, the main electric circuit board 105 is incorporated into the scanner head case 300b. In this state as shown in FIG. 12, the scanner head is connected to a jig (not shown) having, e.g., a connector for supplying test patterns, signals, and electric power to the head terminal portion 309, and various adjustments are performed while the original 18 placed at a reference distance is read. More specifically, the jig is inserted through adjusting holes 1201 and 1202 in the direction of the arrow a in FIG. 12. By hooking this jig in the adjusting hole 1105b of the first lens barrel 1105, the adjustment (focus adjustment; denoted by reference symbol a in FIG. 8) of the position of the first lens barrel 1105 is performed. After that, the first lens barrel 1105 is fixed to the second lens barrel 1001 by a screw 905 (FIG. 9).

Subsequently, the sensor holding plate 1103 is rotated in the direction of the arrow b in FIG. 12, thereby adjusting the inclination (θ in FIG. 8) of the sensor to the optical axis. After that, this sensor holding plate 1103 is fixed by a screw 906a. Note that the main electric circuit board 105 has a shape which does not interfere with this adjustment.

If dimensional variations of the components are large, focusing cannot be performed by the above operation in some cases. If this is the case, the screw 906b is loosened, and the sensor distance adjusting cylinder 1102 is pivoted by a necessary amount to adjust the distance between the sensor 302 and the field lens 304. In this embodiment as described previously, the distance between the sensor 302 and the field lens 304 can be increased or decreased in units of 0.15 mm by a pivot of 7.5°. The sensor holding plate 1103 coupled with the sensor distance adjusting cylinder 1102 also pivots with this pivoting motion. However, it is only necessary to adjust the pivoting angle (θ in FIG. 8) of the sensor around the optical axis by loosening the screw 906a, inserting the jig in the direction of the arrow b in FIG. 12, and pivoting the sensor holding plate 1103 along the long hole 1103a.

According to one aspect of the present invention, deformation of a case member caused by, e.g., the existence of a slit opening can be prevented.

According to another aspect of the present invention, complicated steps such as sealing up for light shielding can be omitted. This can improve the work efficiency and reduce the cost.

According to still another aspect of the present invention, adjustment (e.g., focus adjustment) of an optical system after assembly can be facilitated. This can also improve the work efficiency and reduce the cost.

As many apparently widely different embodiments of the present invention can be made without departing from the spirit and scope thereof, it is to be understood that the invention is not limited to the specific embodiments thereof except as defined in the claims.

What is claimed is:

1. An optical part for forming an image on an image sensing device, comprising:
   a first cylindrical member holding a first lens:
   a second cylindrical member holding a second lens having the same optical axis as said first lens;
   a third cylindrical member for determining the position of said image sensing device in the direction of said optical axis;
   an externally operable first adjusting mechanism for continuously adjusting and fixing the position of said second cylindrical member with respect to said first cylindrical member along said optical axis; and
   an externally operable second adjusting mechanism for stepwise adjusting and fixing the position of said third cylindrical member with respect to said first cylindrical member along said optical axis,
   wherein an amount of adjustment by said second adjusting mechanism is determined in accordance with a stepwise selectable pivoting angle of said third cylindrical member around said optical axis and said stepwise selectable pivoting angle is determined by selecting one of stepwise angles, in a plane intersecting said optical axis, of pivoting an arm connected to said third cylindrical member.

2. The optical part according to claim 1 further comprising a third adjusting mechanism for fixing said image sensing device to said third cylindrical member by pivoting said image sensing device on said optical axis.

3. The optical part according to claim 1 further comprising:
   an electric circuit board for controlling said image sensing device;
   a connecting portion for connecting said electric circuit board to an external electric circuit; and
   a case member for accommodating said components,
   wherein said optical part functions as a scanner head.

4. The optical part according to claim 3 wherein said optical part is used in an apparatus capable of mounting a printhead instead of a scanner head.

5. A processing apparatus comprising:
   a main apparatus; and
   an optical part capable of being attached to and detached from said main apparatus,
      said optical part for forming an image on an image sensing device,
   wherein said optical part comprises:
      a first cylindrical member holding a first lens;
      a second cylindrical member holding a second lens having the same optical axis as said first lens;
      a third cylindrical member for determining the position of said image sensing device in the direction of said optical axis;
      an externally operable first adjusting mechanism for continuously adjusting and fixing the position of said second cylindrical member with respect to said first cylindrical member along said optical axis; and
      an externally operable second adjusting mechanism for stepwise adjusting and fixing the position of said third cylindrical member with respect to said first cylindrical member along said optical axis,
      an amount of adjustment by said second adjusting mechanism is determined in accordance with a stepwise selectable pivoting angle of said third cylindrical member around said optical axis, wherein said stepwise selectable pivoting angle is determined by selecting one of stepwise angles, in a plane intersecting said optical axis, of pivoting an arm connected to said third cylindrical member, and
      said main apparatus processes an image signal provided by said image sensing device.

* * * * *